US012017254B2

(12) United States Patent
Coots

(10) Patent No.: US 12,017,254 B2
(45) Date of Patent: Jun. 25, 2024

(54) DEVICE AND METHOD FOR SEPARATING OTHER TRACK MATERIAL

(71) Applicant: B & B Metals, Inc., Shepherdsville, KY (US)

(72) Inventor: Coty T. Coots, Shepherdsville, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 0 days.

(21) Appl. No.: 17/538,174

(22) Filed: Nov. 30, 2021

(65) Prior Publication Data

US 2022/0176409 A1 Jun. 9, 2022

Related U.S. Application Data

(60) Provisional application No. 63/120,983, filed on Dec. 3, 2020.

(51) Int. Cl.

| | |
|---|---|
| ***B07B 1/22*** | (2006.01) |
| ***B07B 1/00*** | (2006.01) |
| ***B07B 1/24*** | (2006.01) |
| ***B07B 13/16*** | (2006.01) |
| ***E01B 29/24*** | (2006.01) |
| ***E01B 29/32*** | (2006.01) |

(52) U.S. Cl.

CPC ................ *B07B 1/22* (2013.01); *B07B 1/005* (2013.01)

(58) Field of Classification Search

CPC .................................... B07B 1/22; B07B 1/24

USPC ........................................ 209/284, 288, 929

See application file for complete search history.

(56) References Cited

U.S. PATENT DOCUMENTS

| | | | | |
|---|---|---|---|---|
| 1,592,697 A * | 7/1926 | Hovda | B23Q 7/12 209/276 |
| 1,634,192 A * | 6/1927 | Hovda | B23Q 7/12 209/664 |
| 2,807,364 A * | 9/1957 | Suddreth | B23Q 7/12 209/634 |
| 4,024,877 A * | 5/1977 | Welborn | A23N 15/12 460/145 |
| 10,112,215 B1 * | 10/2018 | Coots | B07B 1/005 |

FOREIGN PATENT DOCUMENTS

CA 3140766 A1 6/2022

OTHER PUBLICATIONS

Canadian Patent Application No. 3140766 filed on Nov. 30, 2021.

* cited by examiner

*Primary Examiner* — Michael McCullough
*Assistant Examiner* — Molly K Devine
(74) *Attorney, Agent, or Firm* — Dinsmore & Shohl LLP

(57) ABSTRACT

Various embodiments provide devices and methods for separating other track material (OTM) which is generated during railroad maintenance or replacement procedures. More specifically, but without limitation, embodiments provide devices and methods for separation of materials to desired groups of specific materials.

16 Claims, 6 Drawing Sheets

DEVICE AND METHOD FOR SEPARATING OTHER TRACK MATERIAL

CLAIM TO PRIORITY

This non-provisional patent application claims priority to and benefit of, under 35 U.S.C. § 119(e), U.S. Provisional Patent Application Ser. No. 63/120,983, filed Dec. 3, 2020 and titled "Device and Method for Separating Other Track Material", all of which is incorporated by reference herein.

BACKGROUND

1. Field of the Invention

Various embodiments provide devices and methods for separating other track material (OTM) which is generated during railroad maintenance or replacement procedures. More specifically, but without limitation, embodiments provide devices and methods for separation of mixed OTM materials to desired groups of specific materials.

2. Description of the Related Art

Current tie plate maintenance systems may pick up tie plates and other materials from a railroad materials using magnets during a maintenance procedure. Other systems may be used to sort tie plates in a pile and place them on to a distribution system for subsequent installation.

As part of the increase in environmental consciousness, the railroad industry desires to reuse materials where possible. However, parts of differing types are typically mixed when they are collected. Therefore, where possible, materials must be separated into parts of like type and then must be determined if in a condition for re-use. The materials need to be accurately separated into appropriate groups.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

Present embodiments provide a sorter which separates "other track materials" (OTM) such as anchors and spikes, and accurately separates one group of materials from mixing with the other during the separation process. The instant separator separates mixed OTM materials, for example anchors and spikes, so that the two types of materials may be reviewed for possible reuse.

According to some embodiments, an other track material (OTM) separator may comprise a rotatable receiver having a first feed location at one axial end where the rotatable receiver receives a mixture of railroad parts and a second feed location at a second axial end which discharges part of the mixture of railroad parts, the rotatable receiver having an exterior surface and an interior surface, a plurality of holes extending through the rotatable receiver and spaced circumferentially from the exterior surface to the interior surface, a plurality of pans extending from the exterior surface of the rotatable receiver, each of the pans aligned with one of the plurality of holes, each pan defining a pathway and each pathway defining a direction change, wherein at least one of the parts of the mixture of railroad parts is incapable of passing through the direction change.

According to some optional embodiments, the following optional embodiments and features may be utilized with the separator or in combination with other embodiments and features and the separator. The pan may have a ceiling and a floor. The pan may further comprise a mouth which opens. The direction change may be located near the mouth. The OTM separator may further comprise a drive assembly to rotate the receiver. The OTM separator may further comprise a first pair and a second pair of rotatable supports. The OTM separator may further comprise a first material conveyor at the first feed location. The mixture of railroad parts may comprise railroad anchors and railroad spikes. The railroad anchors are incapable of passing through the direction change. Further, the railroad spikes can pass through the mouth.

According to some embodiments, a method of separating track materials may comprise the steps of rotating a receiver, feeding track materials to the receiver, moving the track materials through holes and pans of the receiver, changing direction of one part of the track materials, retaining a second part of the track materials with a change of direction of the pans, depositing the one part outside the receiver through the pans, and moving the second part to a longitudinal end of the receiver.

According to some optional embodiments, the method may further comprise providing a guide between adjacent holes within the receiver. One of the parts may be spikes. The second part may be anchors. The method further comprising sizing the pans so that the second part cannot pass through a change of direction through the pans.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

In order that the embodiments may be better understood, embodiments of the material separator will now be described by way of examples. These embodiments are not to limit the scope of the present claims as other embodiments of the material separator will become apparent to one having ordinary skill in the art upon reading the instant description. Examples of the present embodiments are shown in figures wherein:

DETAILED DESCRIPTION

Figure 1:
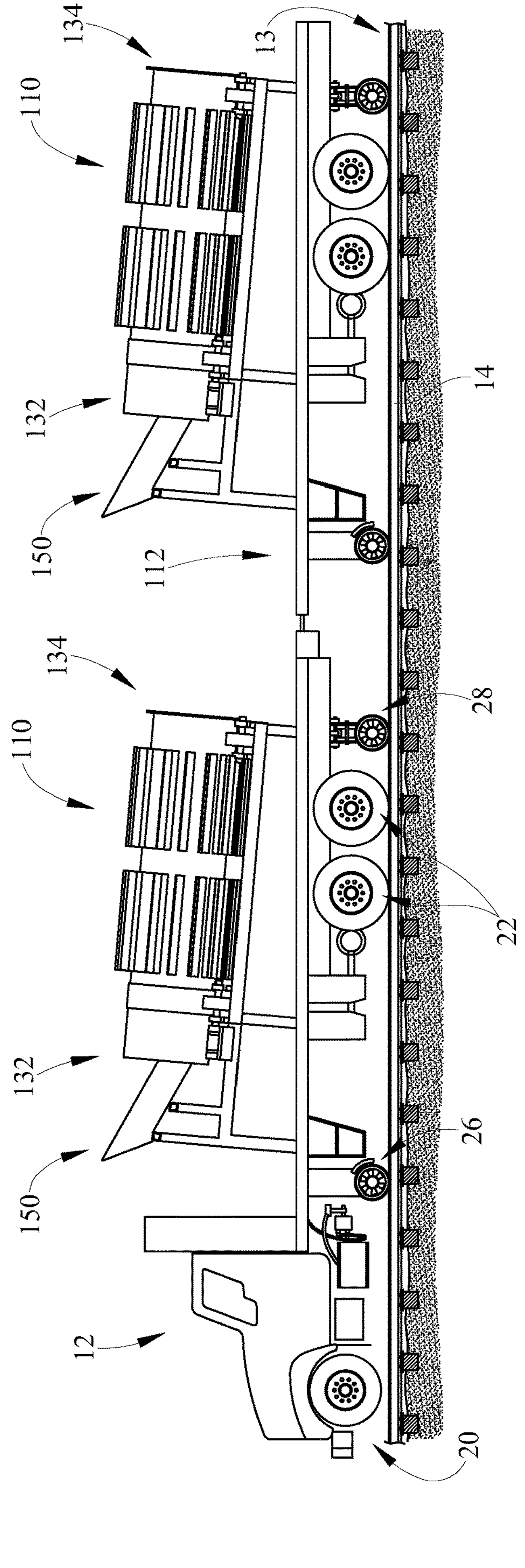
FIG. 1 depicts a side view of a high rail vehicle and flatbed trailer both showing options of material separators mounted thereon.

It is to be understood that the tie plate separator is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the figures, wherein like numeral indicate like elements throughout several views, there are shown in FIGS. 1 through 6 various aspects of a material separator 110, for example an other track material (OTM) separator which separates a mixture or batches of materials such as railroad scrap material produced during maintenance, repair, or refurbishing projects so that at least one desired constituent of the mixture or batch is separated from the remainder of the material. The material separator 110 may separate a variety of materials, for example for fasteners, and may be mounted on a vehicle 12, 112 which either is driveable or may be pushed or pulled by another driveable vehicle at least along railroad tracks or desirably by a high rail vehicle, which is capable of over-the-road travel as well.

Referring now to FIG. 1, a material separator 110 is depicted positioned on a vehicle 12. The vehicle 12 may be a high rail vehicle such as the one depicted which allows for over-the-road travel and/or travel along a rail way. A material separator 110 is mounted on a bed of the vehicle 12. The material separator 110 may be fed material by a crane (not shown) which, in some embodiments, may be mounted on the vehicle 12 or may be mounted to an adjacent vehicle, or may be defined by a separate piece of equipment such as an excavator with a magnet, claw, or grasp mounted for picking material. The crane may be used to provide a material mixture or batch which includes multiple constituents, some of which may be desirable to separate from the remainder of the constituents.

The crane, of any type, may have a claw, bucket or magnet to grab the scrap material and feed the separator 110. The material separator 110 may also be fed by a conveyor, which may be dynamic or static in nature. Still further, the crane may feed a hopper which moves the material to the conveyor, fixed or static, that in turn moves the mixed materials into the separator 110. Various methods of feeding material to the separator 110 may be utilized.

The railroad vehicles 12, 112 are shown together and both with a separator 110. However, this is merely for example that the separator 110 may be used with either vehicle type. In most uses, the separator 110 would not be used with both types of vehicles 12, 112 during a job. In this instance, the Figure is merely depicting the capability for use with either vehicle type. Further, one skilled in the art will understand that both vehicles 12, 112 may be road or rail capable.

Referring to the vehicle 12, in some embodiments, the high rail vehicle is desirable for its ability to travel on the road and on a railroad track 13, as shown. The high rail vehicle 12 may have at least one pair of front tires 20 and at least one set of rear tires 22. In the instant embodiment, the high rail vehicle 12 may include two pairs of rear road tires 22 at least one pair which provide propulsion both on the road and for railway travel. In some embodiments, the front tires 20 may also be driven along with the rear tires or independent of the rear tires. In the instant embodiment, the vehicle 12 also includes two pair of rail wheels. In the depicted embodiment, a forward rail wheel 26 is shown which may be height adjustable to engage the track or disengage the track. As shown, the rail wheel 26 is lowered and supporting the vehicle 12 such that the front tire 20 is elevated from the track. This is one embodiment although not a mandatory limiting feature. Further, at the rear end of the vehicle 12 is a second rear wheel 28 which is also engaging the rail 14 to aid in moving the vehicle 12 over the railroad track 13.

Additionally shown in the figure is an alternative vehicle 112. The material separator 110 may also be disposed on a trailer 112 which is capable of over the road use or rail use. The vehicle 112 may be generally described as a flatbed trailer for at least over the road use.

Figure 2:
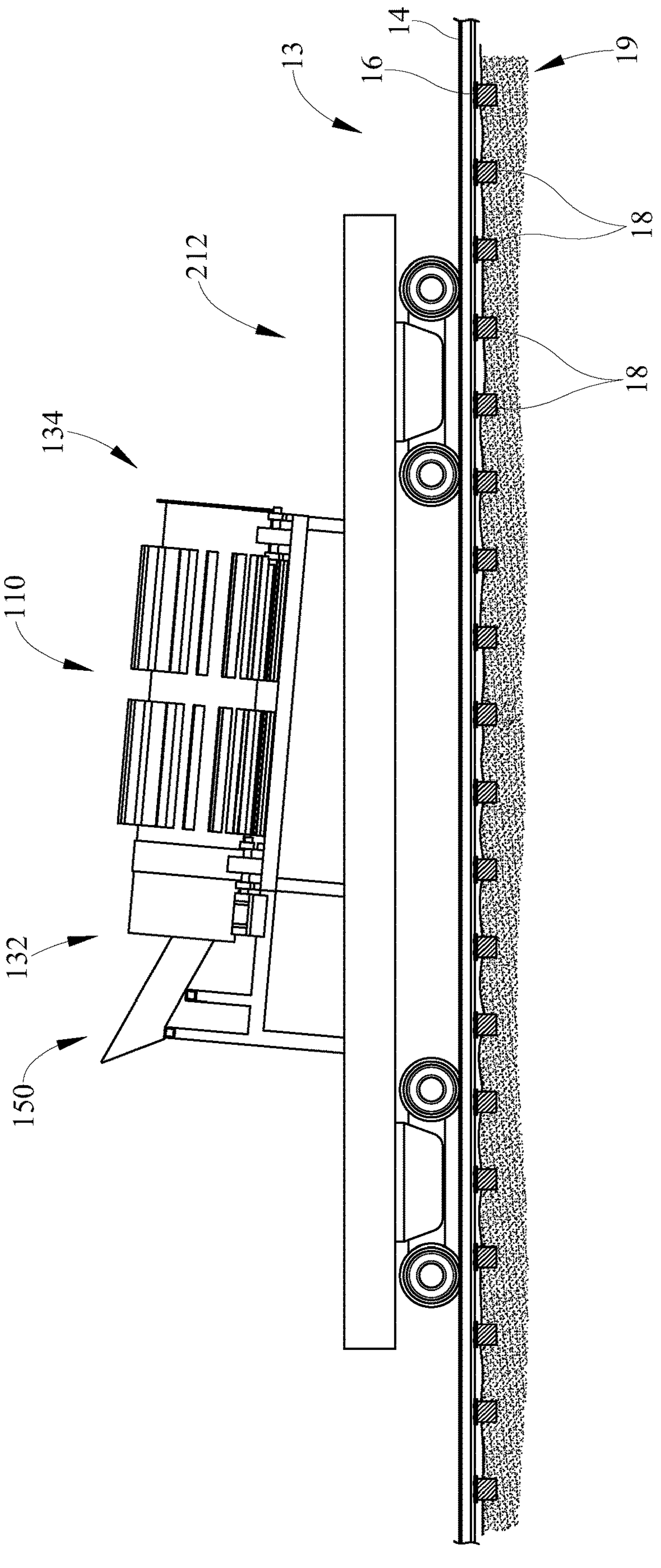
FIG. 2 depicts a side view of a rail car with a material separator mounted thereon.

As shown in FIG. 2, a further alternative of a vehicle is provided. In this embodiment, the vehicle 212 may be a flatbed rail vehicle for rail use only. Thus, the flatbed rail car 212 may be pulled by a locomotive or a high rail vehicle 12 along the tracks to move the material separator 110. The vehicles 12, 112, 212 shown are merely examples and others may be utilized which are capable of supporting the material separator 110.

Also shown in FIG. 2 is the railroad track 13 which is briefly described. A railroad track 13 may comprise a pair of rails 14 which are positioned on tie plates 16. The tie plates 16 may be fastened to railroad ties 18 which are generally laid perpendicular to the rails 14. In some embodiments, the rails 14 may be transverse but not exactly perpendicular to the railroad ties 18 and therefore, such description should not be considered limiting. The railroad ties 18 are positioned in ballast 19 which may be formed of various substrates, which typically include some amount of gravel or rock.

Figure 3:
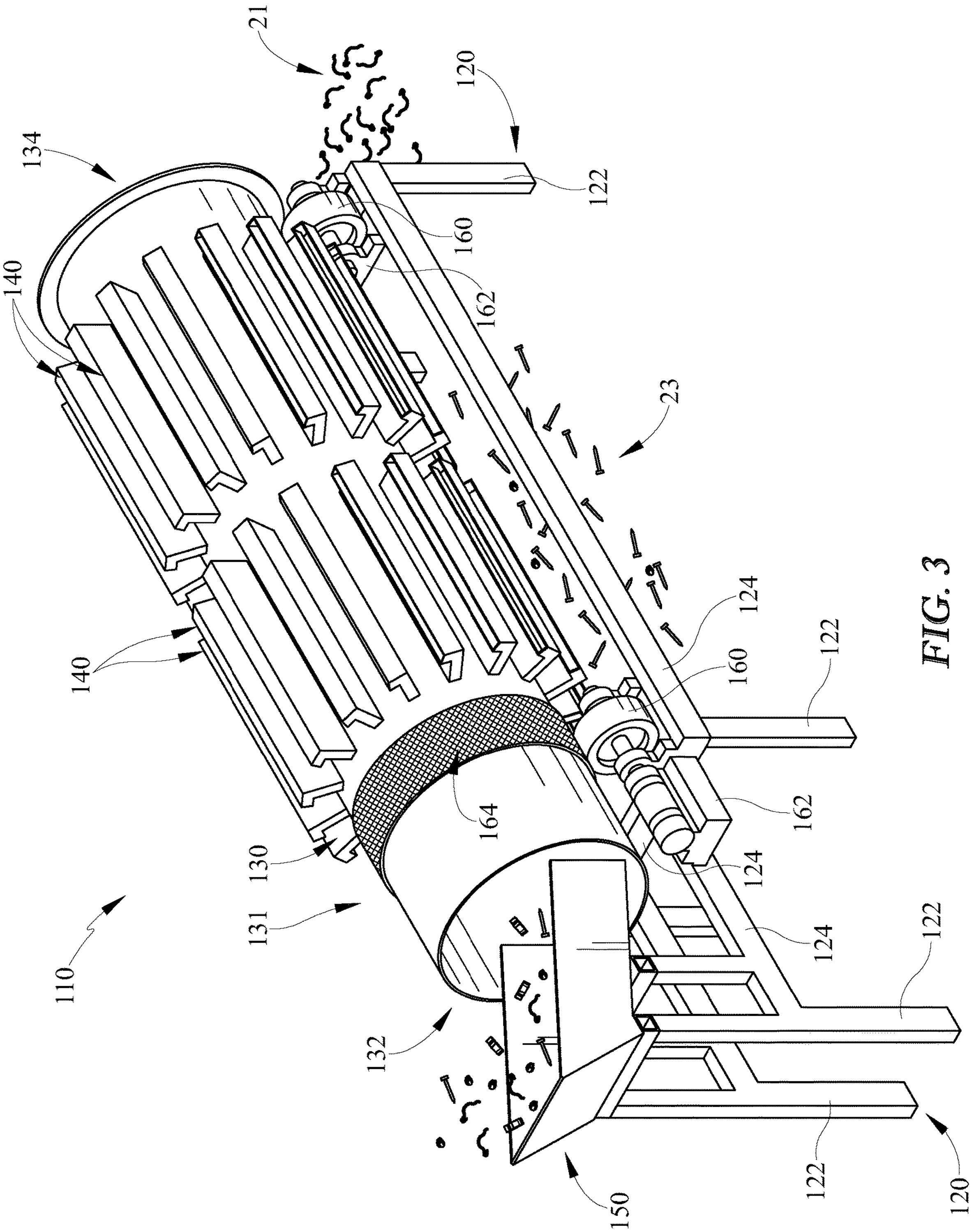
FIG. 3 depicts a perspective view of a material separator removed from the trailer.

Referring now to FIG. 3, a perspective view of the separator 110 is depicted. The separator 110 receives a mixture of other track materials (OTM), and can separate the parts into at least two groups. For example, during railroad maintenance, the process may generate at least three types of OTM: tie plates 16 (FIG. 2), anchors 21, and spikes 23. The tie plates 16 may be first separated by a first machine (not shown), and the remaining anchors 21 and spikes 23 must then be separated. In the instant embodiments, the mixed materials 21, 23 are shown feeding through conveyor 150.

The material separator 110 comprises a frame 120 which supports a rotatable receiver 130. The frame 120 may comprise a plurality of uprights 122 and laterally extending supports 124. These supports 124 may extend in both a longitudinal direction and perpendicular to the longitudinal direction. The uprights 122 may support the laterally extending supports.

With brief additional reference to FIGS. 1 and 2, the vehicles are shown on a flat surface and in this orientation, the receiver 130 is shown having a rotational axis which is angled relative to the horizontal. In such configuration, the receiver 130 is declined from an input end 132 to the output end 134. In order to provide the decline, the frame 120 has uprights 122 of differing lengths so that the receiver 130 is declined. The decline improves movement of the materials through the separator 110. In other embodiments, one or more of the uprights 122 may be adjustable in order to varying the amount of decline and adjust the throughput of material through the separator 110. In still further embodiments, shims or other structures may be used at the rotatable supports in order to provide the decline angle, and maintain the frame of consistent upright 122 length.

The frame 120 supports the rotatable receiver 130 which in some embodiments, may comprise a cylindrical body 131 having circular cross-section. The body 131 may comprise other shapes as well. The receiver 130 comprises a longitudinally extending axis about which the body 131 rotates. The longitudinal axis provides the declined angle, relative to a horizontal, as previously described from the input end 132 to an output end 134.

The receiver 130 may have an inner surface 170 (FIG. 4) and an outer surface 172 (FIG. 4), defined by the body 131.

At the input end 132 of the receiver 130 a conveyor 150 is located. The conveyor 150 may take various forms and may be dynamic (moving) or static (fixed). The term "conveyor" as used herein should not be limited to a belt or roller type conveyor, but may also include chutes, vibratory feeders and other structures, fixed or moving, which may move the mixture of materials from a first location to a second location. Thus both moving and fixed structures may be considered conveyors, as well as combinations of mechanisms. For example, a hopper which may feed into a chute or into a chute and subsequent belt conveyor and into the receiver 130. Various embodiments may be utilized.

The receiver 130 may also comprise a drive assembly to rotate the receiver. The drive assembly may comprise a motor, for example an electric or hydraulic motor. Further, the motor may be operably connected to a drive, for example a chain drive or a gear box, or a combination of both. Of course, other drives may be used in order to rotate the receiver 130.

The receiver 130 may be rotatably supported by rollers 160 and bearings 162. The bearings 162 may be for example pillow block bearings, or other types, which support axles of the rollers 160.

A friction device 164 may be disposed about the receiver 130 which engages a roller 160. Or, alternatively, a friction device may be disposed about the roller, or alternatively both the receiver 130 and the roller 160 may have friction devices. Any of these devices may comprise friction devices to aid in rotation of the receiver 130. For example, expanded metal, rubber, or other materials may be used to aid in friction and traction.

Figure 4:
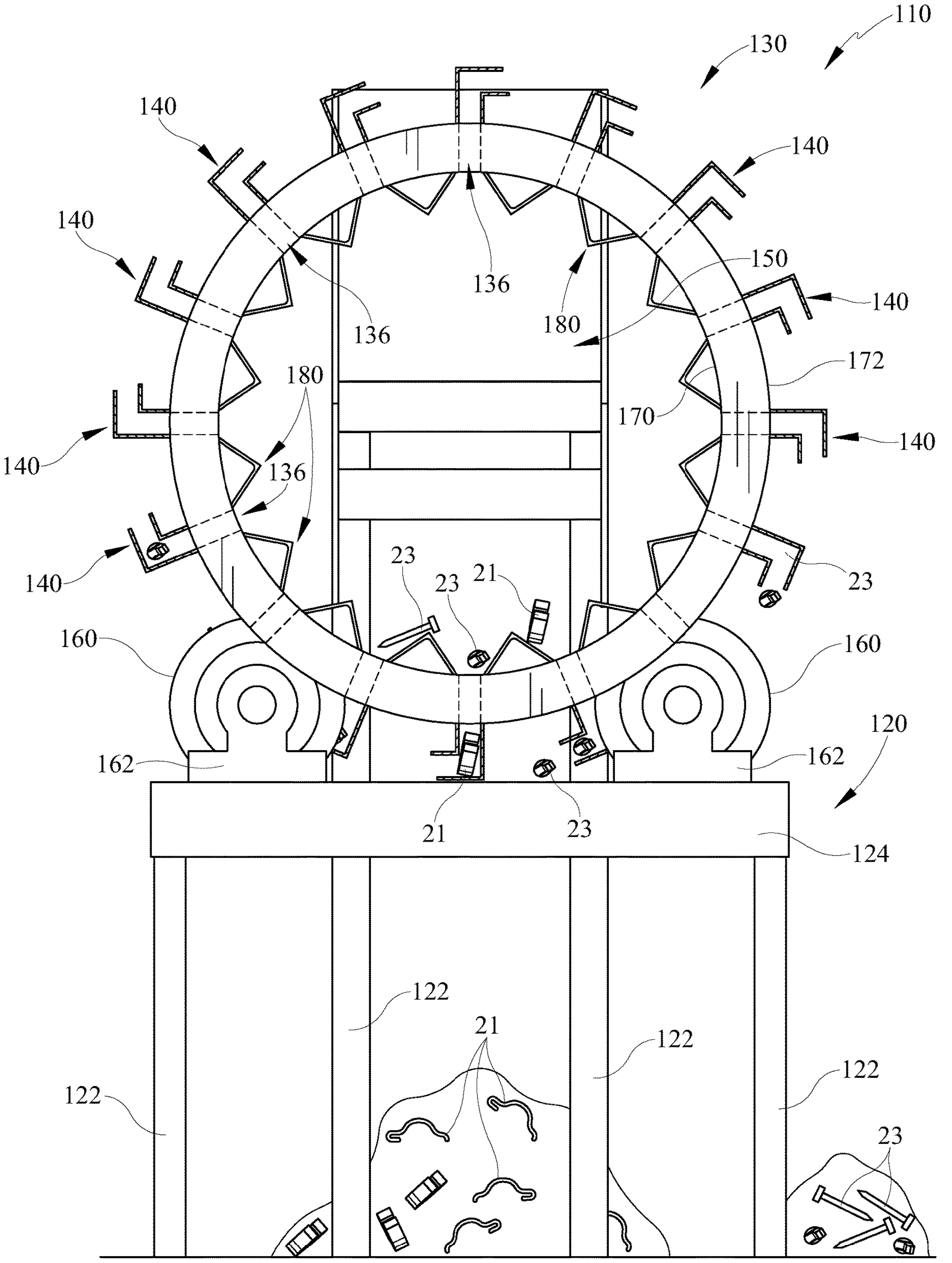
FIG. 4 depicts an end view of the material separator.

The receiver 130 may further comprise an exterior surface 172 (FIG. 4) and an interior surface 170 (FIG. 4). The exterior surface 172 and interior surface 170 may be defined by opposite sides of the metal defining the body 131.

The receiver 130 may comprise a plurality of holes 136 (FIG. 5) that are disposed about the body 131 along the longitudinal direction of the receiver 130. The holes 136 extend radially from the inner surface 170 to the exterior surface 172. Disposed adjacent to each of the receiver holes 136 is a pan 140. Each pan 140 receives the railroad material 21, 23 moving through the rotating receiver 130. The pan 140 functions to allow one type of railroad material, for example spikes 23, to pass through the pan 140, but retains one or more other types of railroad material, for example the anchors 21. As the pan 140 rotates with the receiver 130, the parts that can pass through the pan 140 drop to the ground. These are depicted as the spikes 23 laying beneath the receiver 130. Alternately, the parts that cannot move through the pan 140, the anchors 21, fall back into the receiver 130 and continues to move to the output end 134 of the receiver.

Referring now to FIG. 4, an end view of the receiver is depicted. In the view depicted, the example conveyor 150 is shown. The conveyor 150 feeds mixed materials, for example the anchors 21 and spike 23, to the receiver 130. The frame 120 is depicted below the receiver 130 and supports the receiver 130 for rotation.

In this view, the interior of the receiver 130 is shown. The receiver 130 comprises an interior surface 170, and an exterior surface 172. Extending between the interior surface 170 and the exterior surface 172 are the plurality of holes 136. The receiver 130 has a plurality of holes 136 that pass through the interior to the exterior and into the pans 140.

Disposed about the interior surface 170 of the receiver 130 are a plurality of guides 180. The guides 180 direct movement of the material mixture 21, 23 toward the holes 136. The guides 180 also engage railroad materials 21, 23 toward the input end of the receiver 130 and direct the material to move toward the holes 136 and the pans 140, as opposed to merely "walking" within the bottom portion of the rotating receiver 130. Thus, the engagement with the guides 180 may cause the mixed materials, for examples 21, 23, to continue moving in the axial direction of the receiver 130 and into the holes 136. The guides 180 extend longitudinally through the receiver 130 between the holes 136.

The guides 180 may be formed of various structures. In some non-limiting examples, the guides 180 may be formed of angle iron. Each guide 180 is disposed between the holes 136 so that one surface of each guide 180 is position along a longitudinal edge of each holes 136. In this way, each pair of guides 180 form a funnel shape which is wider than each hole 136. Accordingly, the materials 21, 23 are guided or funneled into the holes 136 by two adjacent structures 180. While the guides 180 are shown as angle irons, one skilled in the art should recognize that various shapes may be used in order to move the mixed materials from the input end receiver 130 along the interior of the receiver 130 and further into the pans 140.

As shown in FIG. 4, the pans 140 each extend from the exterior 172 of the receiver 130. The pans 140 function as a gate to allow certain parts to pass while excluding other parts. For the oversized parts that cannot pass through the pan 140 and return to the receiver 130 during rotation, these oversized parts move toward the output end 134 (FIG. 1, 2) of the receiver 130 and exit.

Additionally, while the anchors 21 and the spikes 23 are shown in separated or sorted piles, alternatives are contemplated wherein the sorted components are deposited. For example, the anchors 21 or the spikes 23, or both may be deposited on a conveyor. This may be a static mover or a dynamic mover. Each of the sorted components may be moved to a trailer or vehicle, or a rail car for further transport. The components may also be moved by way of conveyor to a dumpster for weighing or further movement.

Figure 5:
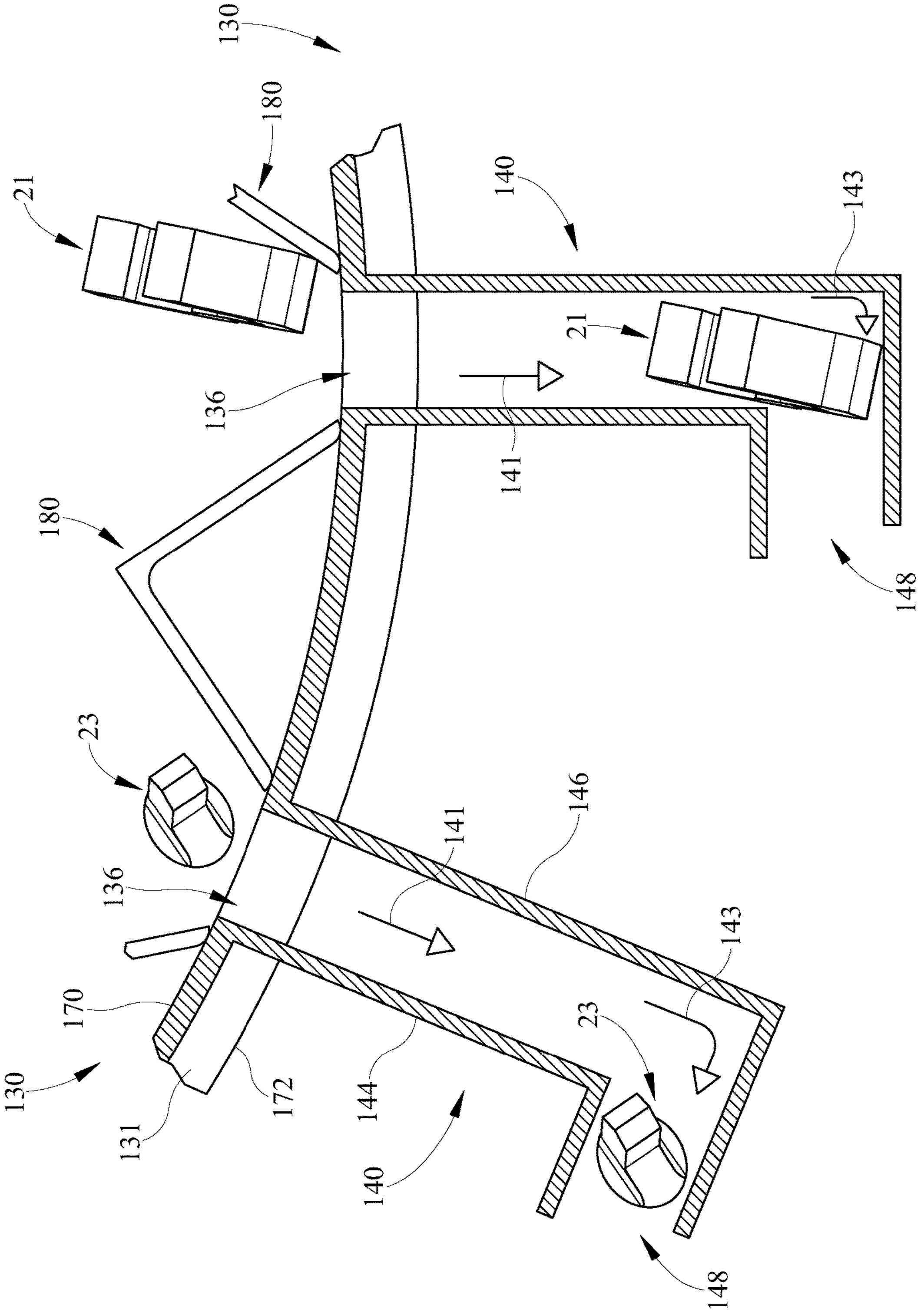
FIG. 5 is a cross sectional view of the pan.

Referring now to FIG. 5, a cross-sectional view of two pans 140 is provided. The cross-sectional view provides a view of a path 141 through the pan 140. The path 141 extends away from the body 131 of the receiver 130 and turns, for example at a direction change or bend 143. In the example embodiment the bend is about 90 degrees, however other angles and/or ranges may be used.

The pan 140 comprises a ceiling 144 and a floor 146. The open end of the pan 140 defines a mouth 148 where certain of the parts of the mixture may exit after passing through the pan 140.

As shown in the view, each of the two pans has one of the types so parts—one has a spike 23 in the pan 140 and the other has an anchor 21. The spacing of the ceiling 144 from the floor 146 at the direction change or bend 143 is sized so that spike 23 can pass through the direction change or bend 143 and move to the mouth 148.

To the contrary, the adjacent pan 140 shows an anchor at the direction change or bend 143. The spacing of the ceiling 144 from the floor 146 at the direction change or bend 143 precludes movement of the anchor 21 through the direction change or bend 143. Therefore the anchor 21 stops movement in this area until the pan 140 has rotated to an upper position of its rotational path with the receiver 130. Once the pan is at this upper position, gravity forces the anchor 21 to reverse and fall through the path 141 back into the receiver 130.

Figure 6:
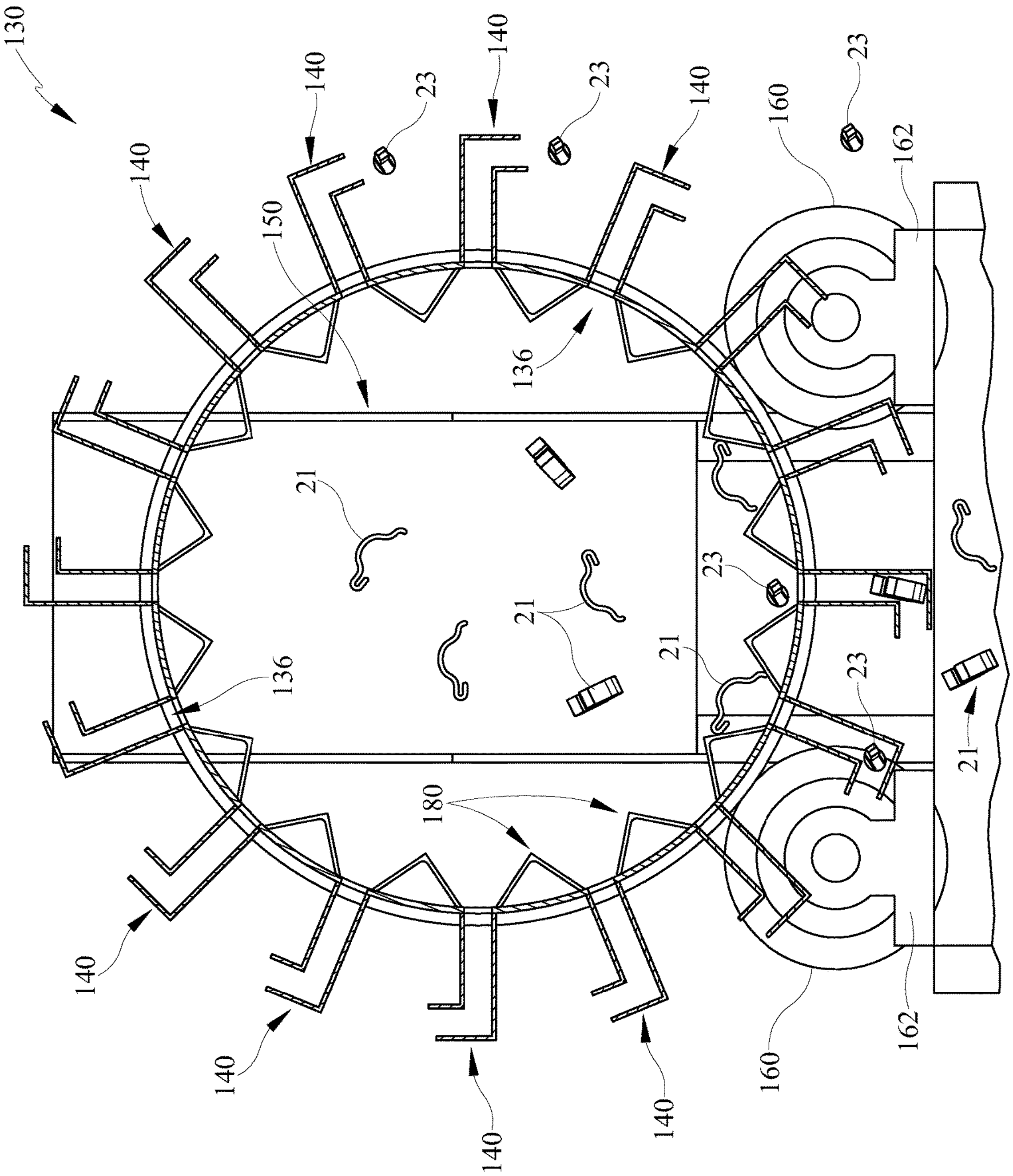
FIG. 6 is a first sequence of views.

With reference now to FIG. 6, the end view depicts the mixture of materials falling into the center of the receiver 130. As shown, the anchors 21 that cannot pass through the pan 140 return into the receiver 130 as the pan 140 rotates and the pan reaches the upper half of its rotation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An other track material (OTM) separator, comprising:

a rotatable receiver having a first feed location at one axial end where said rotatable receiver receives a mixture of railroad parts and a second location at a second axial end which discharges a portion of said mixture of railroad parts;

said rotatable receiver having an exterior surface and an interior surface, said exterior surface being curved and defining a cylindrical shape;

a plurality of holes extending through said rotatable receiver from said exterior surface to said interior surface and spaced circumferentially;

a plurality of pans extending outwardly from said exterior surface of said rotatable receiver, each pan of said plurality of pans aligned with one hole of said plurality of holes;

said each pan having a ceiling defined by a first ceiling portion and a second ceiling portion, and a floor defined by a first floor portion and a second floor portion, said first ceiling portion and said first floor portion being parallel, and said second ceiling portion and said second floor portion being parallel, wherein said first ceiling portion is shorter than said first floor portion and said second ceiling portion is shorter than said second floor portion;

said each pan of said plurality of pans defining a pathway and each said pathway defining a direction change wherein said direction change is located outwardly of said exterior surface of said rotatable receiver, and said direction change is closer to a mouth of said pan than said one hole;

wherein said portion of the mixture of railroad parts is incapable of passing through said direction change due to spacing between said ceiling and said floor at said direction change.

2. The OTM separator of claim 1, said ceiling and said floor each being substantially L-shaped.

3. The OTM separator of claim 2, said each pan further comprising said mouth which opens for exit of certain parts of said mixture of railroad parts.

4. The OTM separator of claim 3, said direction change located between said first floor portion and said second floor portion of said ceiling and said floor.

5. The OTM separator of claim 3, said mixture of railroad parts comprising railroad anchors and railroad spikes.

6. The OTM separator of claim 5 wherein said railroad anchors are incapable of passing through said direction change.

7. The OTM separator of claim 5, wherein said railroad spikes can pass through said mouth.

8. The OTM separator of claim 1, further comprising a drive assembly to rotate said rotatable receiver.

9. The OTM separator of claim 8 further comprising a first pair and a second pair of rotatable supports.

10. The OTM separator of claim 1 further comprising a first material conveyor at said first feed location.

11. A method of separating track materials, comprising the steps:

rotating a receiver in a single direction;

feeding track materials to the receiver;

moving said track materials through holes and pans of said receiver, said pans each having a ceiling having a first ceiling portion and a second ceiling portion and a floor having a first floor portion and a second floor portion which have one or more parallel portions, said pans extending from an outer surface of said receiver and wherein said ceiling and said floor are positioned radially outward of said outer surface, said first ceiling portion and said first floor portion being parallel, and said second ceiling portion and said second floor portion being parallel, wherein said first ceiling portion is shorter than said first floor portion and said second ceiling portion is shorter than said second floor portion;

changing direction of one part of the track materials;

retaining a second part of the track materials within said pans;

depositing said one part outside the receiver through the pans; and, moving said second part to a longitudinal end of said receiver.

12. The method of claim 11, providing a guide between adjacent said holes within said receiver.

13. The method of claim 11, said one part being spikes.

14. The method of claim 13, said second part being anchors.

15. The method of claim 11, further comprising sizing said pans so that said second part cannot pass through a change of direction through said pans.

16. An other track material (OTM) separator, comprising:

a rotatable receiver having a first feed location at one axial end where said rotatable receiver receives a mixture of railroad parts and a second location at a second axial end which discharges a portion of said mixture of railroad parts;

said rotatable receiver having an exterior surface and an interior surface;

a plurality of holes extending through said rotatable receiver from said exterior surface to said interior surface and spaced circumferentially;

a plurality of pans extending beyond said exterior surface of said rotatable receiver, each pan of said plurality of pans aligned with one of said plurality of holes;

said each pan having a ceiling defined by a first ceiling portion and a second ceiling portion, and a floor defined by a first floor portion and a second floor portion, said first ceiling portion and said first floor portion being parallel, and said second ceiling portion and said second floor portion being parallel;

said plurality of pans each having a length dimension that extends parallel to an axial direction of said rotatable receiver, wherein said mixture of railroad parts moves into an axial orientation along a pathway through each pan of said plurality of pans;

said each pan of said plurality of pans defining said pathway and each said pathway defining a direction change wherein said direction change is located outwardly of said exterior surface of said rotatable receiver;

wherein said portion of the mixture of railroad parts is incapable of passing through said direction change.

* * * * *